United States Patent [19]

Koda et al.

[11] E Re. 28,938

[45] Reissued Aug. 24, 1976

[54] ORGANOPOLYSILOXANE COMPOSITION HAVING IMPROVED HEAT STABILITY

[75] Inventors: Yoshinobu Koda, Chiba; Shosaku Sasaki; Yoshiyuki Koda, both of Ichihara, all of Japan

[73] Assignee: Toray Silicone Company, Ltd., Tokyo, Japan

[22] Filed: Sept. 15, 1975

[21] Appl. No.: 613,722

Related U.S. Patent Documents

Reissue of:

[64] Patent No.: 3,884,950
Issued: May 20, 1975
Appl. No.: 424,524
Filed: Dec. 13, 1973

[30] Foreign Application Priority Data

Dec. 18, 1972 Japan ..... 47-126200

[52] U.S. Cl. ..... 260/448.2 S; 252/49.7; 260/45.75 R; 260/46.5 G; 260/448.8 R; 260/429.2

[51] Int. Cl.[2] ..... C07F 7/08

[58] Field of Search ..... 260/45.75 R, 448.2 S, 260/46.5 G, 448.8 R; 252/49.7

[56] References Cited

UNITED STATES PATENTS 3,008,901 11/1961 Baker et al. ..... 252/49.7

*Primary Examiner*—Paul F. Shaver
*Attorney, Agent, or Firm*—Robert L. McKellar

[57] ABSTRACT

The reaction product of a cerium salt of an organic carboxylic acid which is soluble in an aromatic hydrocarbon or a chlorinated hydrocarbon solvent with an alkali metal siloxanolate having an average of at least three siloxane units per molecule is employed as a heat stability additive in silicone fluids and silicone elastomers.

10 Claims, No Drawings

ORGANOPOLYSILOXANE COMPOSITION HAVING IMPROVED HEAT STABILITY

Matter enclosed in heavy brackets [ ] appears in the original patent but forms no part of this reissue specification; matter printed in italics indicates the additions made by reissue.

This invention relates to organopolysiloxane compositions based on essentially linear polymers which exhibit improved heat stability. More specifically, this invention relates to silicone fluids and silicone elsastomers containing cerium siloxanolates and exhibit improved stability when exposed to elevated temperatures.

It has been well known to improve the heat stability of organopolysiloxane compositions by incorporating therein certain inorganic salts of metals including iron, zirconium, cerium, manganese and nickel. Particularly with respect to the cerium compounds, it has been known to incorporate cerium oxides, cerium hydroxides and cerium salts of aromatic carboxylic acids in organopolysiloxane compositions as shown in Japanese Pat. No. 283,598 and in Japanese Pat. No. 535,121. However, these metal salts and metal compounds as described above required incorporation into the organosiloxane composition in the form of a pre-compounded paste. The metal salt was first formed into a paste in a portion of organopolysiloxane or a solution in an organic solvent because the metal compound per se was not readily compatible with or easily mixed into the organopolysiloxane composition. Even when the metal compounds were so pre-mixed with organic solvent or organopolysiloxane, the resulting solution or paste was difficult to disperse uniformly and satisfactorily throughout the organopolysiloxane composition and the desired heat stabilizing effect was not realized.

The failure of the cerium compounds employed in the prior art to impart the desired degree of heat stability is clearly seen in the failure to impart heat stability to organopolysiloxane fluids having relatively low viscosities when an organic salt of cerium, as set forth above, is incorporated in a lower viscosity organopolysiloxane fluid, the cerium compound forms an incompatible sediment and separates from the fluid.

In order to overcome the defects noted above, it has been proposed in U.S. Pat. No. 3,008,901 to dissolve or colloidally disperse in the organopolysiloxane composition a cerium compound prepared by heating a mixture of a specific cerium complex with organopolysiloxane fluids containing a small proportion of hydrogen atoms bonded to silicon (SiH) in an aromatic hydrocarbon solvent at 280° to 290°C. for 1 to 4 days while bubbling air through the reaction mixture. However, even when such a method is employed to prepare the cerium compound, it is found that only a very small proportion of the resulting cerium material is compatible with the organopolysiloxanes. Further, it has proven to be difficult to determine the proportion of cerium actually added to the organopolysiloxane because the wide fluctuation of reaction condition employed results in an inconsistent and generally uncontrolled cerium compound. Of course, the lack of consistency in the chemical composition of the additive results in inconsistent results in the ultimate product containing the cerium compound as a heat stability additive. This is obviously a serious defect insofar as large scale commercial production of such materials is concerned.

The primary object of this invention is to introduce organopolysiloxane compositions exhibiting significantly improved heat stability. Another object of this invention is to introduce a cerium compound of consistent quality which is compatible with and easily dispersed in organopolysiloxane fluids and elastomer compounds. Other objects and advantages of this invention are disclosed in or will be apparent from the disclosure and claims which follow.

This invention employs the reaction product of (1) a cerium salt of an organic carboxylic acid and (2) an alkali metal siloxanolate having at least three organosiloxane units per molecule as a heat stability additive in organosilicon compounds based on essentially linear organopolysiloxanes and more particularly organosiloxane fluids and elastomers based on essentially linear diorganopolysiloxanes. The reaction product of a cerium carboxylate and alkali metal siloxanolate is compatible with the organosiloxane compositions and imparts superior heat stability to the products.

The organopolysiloxanes employed in this invention are essentially linear polymers of the unit formula $R_nSiO_{4-n/2}$ where n has an average value of 1.98 to 2.01 and R is a monovalent hydrocarbon or halogenated hydrocarbon radical having 1 to 30 carbon atoms, preferably methyl, ethyl, propyl, 3,3,3-trifluoropropyl, phenyl and vinyl radicals. These polymers are well known in the art and are predominantly diorganosiloxanes ($R_2SiO$) with minor amounts (less than ten mol percent) of $R_3SiO_{1/2}$ units, $RSiO_{3/2}$ units and $SiO_{4/2}$ units. The endblocking groups on the linear polymers can be, inter alia, $HOR_2SiO_{1/2}$, $R_3SiO_{1/2}$, alkoxy $R_2SiO_{1/2}$ or $CH_2{=}CHR_2SiO_{1/2}$. The viscosity of the polymer can vary from very thin fluids (e.g. 1 cs. at 25°C.) to gum-like materials (e.g., $10^6$ cs/ at 25°C.) All of these materials are well known, prepared by known methods and many are commercially available.

The heat stability additive employed herein is the reaction product of a cerium salt of an organic carboxylic acid which is soluble in an aromatic hydrocarbon or chlorinated hydrocarbon solvent such as cerium 2-ethylhexoate and cerium naphthoate with an alkali metal siloxanolate such as potassium and sodium siloxanolates having an average of at least three siloxane groups per molecule.

The alkali metal siloxanolates can be prepared by known methods as illustrated by Grubb and Osthoff in the Journal of the American Chemical Society, Vol. 77, page 1,405 (1955). The alkali metal siloxanolates so prepared have silanolate groups (MOSi ≡ where M is alkali metal) at both ends of an essentially linear molecule and can be further rearranged to form alkali metal siloxanolates having silanolate groups on one end of the polysiloxane chain by reaction with other linear organopolysiloxanes. These later "monofunctional" alkali metal siloxanolates are preferred reactants herein. Examples of such siloxanolates are those in which the organic radicals are methyl, ethyl, phenyl, vinyl and 3,3,3-trifluoropropyl. Other examples are potassium dimethylsiloxanolate, sodium dimethylsiloxanolate, potassium methylphenylsiloxanolate or sodium methylphenylsiloxanolate.

Aromatic hydrocarbon solvents and chlorinated hydrocarbon solvents are preferred as the reaction medium in which the cerium salt of carboxylic acid is reacted with the alkali metal siloxanolate. However, mixtures of aromatic hydrocarbon solvents or chlorinated hydrocarbon solvents with other organic solvents can be employed.

The reaction of the cerium salt with the alkali metal siloxanolate is accelerated by heating the reaction mixture. Preferably, the reaction is carried forward at the reflux temperature of the reaction mixture. Small amounts of catalysts such as dialkylformamide or hexaalkylphosphoramide can be employed.

The proportion of alkali metal siloxanolate to cerium salt in the reaction mixture is not critical but best results are achieved with a reaction mixture containing 1 to 5 alkali metal siloxanolate groups for each cerium atom in the reaction mixture.

Reaction begins with the mixing of the reactants in the organic solvent medium and will be completed within 30 minutes to 24 hours depending upon reaction temperature. After reaction is completed, the organic solvent is removed and any precipitates generated are removed by filtration. The desired reaction product is usually obtained as a liquid which can be easily and uniformly dissolved in or dispersed in organopolysiloxanes. Further, by selecting an alkali metal siloxanolate having the appropriate number and species of organosiloxane units in accordance with the chemical structure of the organopolysiloxanes in which the reaction product is to be employed, extreme compatibility of the additive with the organopolysiloxane can be insured. This excellent compatibility results in transparent fluids and elastomers exhibiting excellent heat stability.

The cerium content of the reaction product employed herein is usually 0.5 to 5 percent by weight based on the weight of the reaction product. It is preferred to employ the reaction product in the organopolysiloxane fluid or elastomer in proportions such that the ultimate product contains from 0.01 to 1.0 percent by weight of cerium based on the weight of the product. However, diminished heat stability can be realized below the 0.01 percent level of cerium and the lack of change in clarity or color of the product is generally achieved with 0.01 percent to 0.1 percent by weight of cerium added.

The cerium reaction product prepared as described above can be added to organosiloxane fluids and organosiloxane gums which are compounded with known fillers such as silicas and mixed with metal soaps or pigments, and heat vulcanizable or room temperature vulcanizable silicone rubber compositions having improved heat stability can be prepared by compounding the composition of this invention with organic peroxides such as benzoylperoxide, 2,4-dichlorobenzoylperoxide and t-butylperoxide or with known crosslinkers such as alkyl silicates, triacetoxysilane, trioximesilane and methylhydrogenpolysiloxane and known curing catalysts such as tin salts of fatty acids and platinum compounds together with inorganic fillers.

The cerium carboxylate-alkali metal siloxanolate reaction products are compatible and dispersible in organopolysiloxanes so that small amounts of the reaction products incorporated in organopolysiloxanes will impart heat stability characteristics equivalent to the characteristics achieved with much larger amounts of previously known heat stability additives such as cerium oxides. Further, the process for incorporating the heat stability additive of this invention is much simpler because of the compatibility and/or solubility of the cerium siloxanolate in the organopolysiloxane. This, of course, is a great advantage for commercial operations.

The following examples illustrate the invention and assist those skilled in the art to better understand the invention. The examples do not limit the scope of the invention which is delineated in the claims.

EXAMPLE 1

33 g. of potassium siloxanolate prepared by known methods from potassium hydroxide, hexamethylcyclo trisiloxane and octamethylcyclotetrasiloxane and 0.3 g. of hexamethylphosphoramide were added to 6.7 g. of trimethylsilyl endblocked dimethylpolysiloxane having a viscosity of 20 cs. at 25°C. The mixture was heated at 115°C. for 1 hour under a nitrogen stream. 120 g. of dry xylene and 16 g. of cerous 2-ethylhexoate were added to the reaction mixture which was then heated at reflux temperature for 2.5 hours.

After cooling the reaction mixture to room temperature, 3 g. of trimethylchlorosilane was added to neutralize the catalyst. The reaction product ($R_1$) was a light yellow liquid obtained after evaporation of the solvent under reduced pressure and filtration to remove precipitates. The cerium content of $R_1$ was 1.2 percent by weight.

4.5 grams of reaction product $R_1$ was added to 150 grams of dimethylpolysiloxane fluid having a viscosity of 350 cs. at 25°C. and the mixture was placed in a 300 ml. glass beaker. The reaction product $R_1$ dissolved readily and uniformly in the polymer by simple stirring. This mixture was labelled Sample A.

For comparison purposes, Sample B was prepared and consisted of 150 grams of the same dimethylpolysiloxane employed in Sample A.

Samples A and B were placed in an air circulating oven heated to 300°C. After 7 hours, Sample B had gelled. Sample A did not gel even after 24 hours at 300°C. in the air circulating oven and the viscosity of Sample A had increased only to 420 cs. at 25°C.

EXAMPLE 2

Following the method set forth in Example 1 for preparing reaction product $R_1$ cerium naphthoate was employed in place of the cerous 2-ethylhexoate to produce reaction product $R_2$ containing 1.1 percent by weight of cerium.

0.25 g. of reaction product $R_2$ was uniformly dispersed in 10 g. of a copolymer of 60 mol percent phenylmethylsiloxane units and 40 mol percent of dimethylsiloxane units, said copolymer having a viscosity of 350 cs. at 25°C. The mixture was labelled Sample C and placed in a 50 ml. glass beaker. The control (Sample D) was 10 g. of the same phenylmethylsiloxanedimethylsiloxane copolymer in a 50 ml. glass beaker.

Samples C and D were placed in an air circulating oven heated at 300°C. Sample D gelled after 67 hours at 300°C. in the oven and Sample C had not gelled after 180 hours in the oven at 300°C.

EXAMPLE 3

100 g. of potassium siloxanolate prepared as described in Example 1 was mixed with 12 g. of cerous 2 ethylhexoate dissolved in 150 g. of dry xylene. The mixture was heated at reflux temperature for 3 hours under nitrogen.

The reaction mixture was cooled to room temperature and 3 g. of trimethylchlorosilane was added to neutralize the unreacted potassium silanolate. The reaction product $R_3$ was a light yellow liquid obtained after distilling off the solvent under reduced pressure and filtering to remove the generated precipitates. The cerium content of reaction product $R_3$ was 1.1 percent by weight.

In a 50 ml. glass beaker, there was placed 10 g. of dimethylpolysiloxane having a viscosity of 100 cs. at 25°C. and 0.1 g. of reaction product $R_3$ was easily dissolved in the dimethylpolysiloxane. This mixture was Sample E. The control Sample F, consisted of 10 g. of the same dimethylpolysiloxane employed in Sample E and placed in a 50 ml. glass beaker.

Samples E and F were placed in an air circulating oven heated at 250°C. Sample F had gelled after 24 hours in the oven and had a weight loss of 11.7 percent by weight. Sample E did not gel even after 48 hours in the oven and had a weight loss of only 6.5 percent after 48 hours.

EXAMPLE 4

100 parts by weight of an organosiloxane copolymer gum having a Williams plasticity of 150 as measured by Japanese Industrial Standard C-2123, said compolymer containing 99.9 mol percent dimethylsiloxane units and 0.1 mol percent of methylvinylsiloxane units, was compounded in a conventional manner with 25 parts by weight of fume silica. The polymer-silica mixture was milled and 0.7 parts by weight in the form of a paste in an equal amount of dimethylpolysiloxane was added and thoroughly dispersed through the mixture. This mixture was gum compound A.

Cerium oxide was mixed with equal weight dimethylpolysiloxane having a viscosity of 50,000 cs. at 25°C. to form a paste and the cerium oxide - dimethylpolysiloxane paste was mixed with sufficient gum compound A to form gum compound B containing 1,000 ppm of cerium.

Gum compound C was within the scope of this invention and was prepared on a roll-mixer employing gum compound A and sufficient of reaction product $R_4$ prepared as below to obtain 100 ppm of cerium in the gum compound.

Reaction product $R_4$ was prepared by admixing 40 g. of a mixture of hexamethylcyclotrisiloxane and octamethylcyclotetrasiloxane, 2.7 g. dimethylformamide and 2.8 g. sodium trimethylsilanolate, prepared by the method described by L. H. Sommer et al., Journal of the American Chemical Society, Vol. 68, page 2,282, (1946), in solution in 10 g. of toluene. The mixture was heated at 105° to 110°C. for 3 hours. A mixture of 65 g. of xylene and 11.5 g. of cerous 2-ethylhexoate was added to the reaction mixture which was then heated at reflux temperature for 3 hours. The reaction mixture was cooled to room temperature and trimethylchlorosilane was added to neutralize any remaining sodium siloxanolate. Xylene, toluene and dimethylformamide were distilled off under reduced pressure. The generated precipitates were filtered off and the liquid reaction product $R_4$ was obtained. The reaction product $R_4$ contained 1.3 percent by weight of cerium.

The gum compounds A, B and C, were pressmolded at 120°C. for 10 minutes followed by a further cure in an air circulating oven at 250°C. for 1 hour. The silicone rubber samples so prepared were subjected to heat aging for 3 days in an air circulating oven heated at 250°C. to test the heat stability of the rubber. The tests were carried out under Japanese Industrial Standard C-2123. The results are tabulated below:

| Gum Compound | | Durometer | Tensile Strength kg/cm² | Elongation % |
|---|---|---|---|---|
| A | Before heat aging | 32 | 61 | 610 |
| | After heat aging | 73 | 41 | 43 |
| B | Before heat aging | 33 | 56 | 570 |
| | After heat aging | 34 | 54 | 430 |
| C | Before heat aging | 35 | 56 | 580 |
| | After heat aging | 37 | 54 | 440 |

As shown in the above table, 100 ppm of the reaction product $R_4$ prepared in accordance with this disclosure gives equivalent heat stabilizing effect to silicone rubber as 1,000 ppm of cerium oxide and reaction product $R_4$ is more easily dispersed uniformly throughout the rubber than is the cerium oxide.

That which is claimed is:

1. A method for improving the heat stability of organosilicon compounds in which the substituents on the silicon are monovalent hydrocarbon or halogenated monovalent hydrocarbon radicals having 1 to 30 carbon atoms comprising adding thereto the reaction product of a cerium salt of an organic carboxylic acid which is soluble in an aromatic hydrocarbon solvent or a chlorinated hydrocarbon solvent with an alkali metal siloxanolate having an average of at least three organosiloxane units per molecule and in which the substituents on the silicon are methyl, ethyl, phenyl, vinyl or 3,3,3-trifluoropropyl.

2. The method of claim 1 wherein the organosilicon compound is an organosiloxane fluid or an organosiloxane elastomer.

3. The method of claim 1 wherein the cerium salt of an organic carboxylic acid is cerium 2-ethylhexoate or cerium naphthoate.

4. The method of claim 1 wherein the alkali metal siloxanolate is potassium dimethylsiloxanolate, sodium dimethylsiloxanolate, potassium methylphenylsiloxanolate or sodium methylphenylsiloxanolate.

5. The method of claim 1 wherein the alkali metal siloxanolate is an essentially linear diorganosiloxane wherein the organic radicals bonded to silicon are selected from the group consisting of methyl, ethyl, phenyl, vinyl and 3,3,3-trifluoropropyl, one of the endblocking units being an alkali metal siloxanolate unit and the other endblocking unit being a triorganosiloxy unit wherein the organic substituents are as above defined.

6. The method of claim 1 wherein the reaction is carried forward in an aromatic hydrocarbon solvent or a chlorinated hydrocarbon solvent.

7. The method of claim 1 wherein the reaction is carried forward at reflux temperature of the mixture.

8. The method of claim 1 wherein the ratio of the alkali metal siloxanolate to the cerium salt of an organic carboxylic acid employed in the reaction is such that there is 1 to 5 alkali metal siloxanolate units per cerium atom present.

9. A heat stabilized organosilicon compound consisting essentially of an organosiloxane fluid or an organosiloxane elastomer in which fluid or elastomer the substituents on the silicon are monovalent hydrocarbon or monovalent halohydrocarbon radicals of 1 to 30 carbon atoms containing as an additive, 0.5 to 5 percent by weight of the compound of a cerium siloxanolate in which siloxanolate the substituents on the silicon are methyl, ethyl, phenyl, vinyl or 3,3,3-trifluoropropyl.

10. The heat stabilized organosilicon compound of claim 9 wherein the additive is prepared by reacting a cerium salt of an organic carboxylic acid which is soluble in aromatic hydrocarbon solvents or chlorinated hydrocarbon solvents with a potassium or sodium siloxanolate.

* * * * *